(12) United States Patent
Steinkogler et al.

(10) Patent No.: US 11,353,560 B2
(45) Date of Patent: Jun. 7, 2022

(54) POLYGON SCANNER AND METHOD OF DETECTING OBJECTS IN A MONITORED ZONE

(71) Applicant: SICK AG, Waldkirch (DE)

(72) Inventors: Sascha Steinkogler, Waldkirch (DE); Florian Schneider, Waldkirch (DE); Helmut Weber, Waldkirch (DE); Stefan Seitz, Waldkirch (DE); Martin Högy, Waldkirch (DE)

(73) Assignee: SICK AG, Waldkirch (DE)

( * ) Notice: Subject to any disclaimer, the term of this patent is extended or adjusted under 35 U.S.C. 154(b) by 870 days.

(21) Appl. No.: 16/196,567

(22) Filed: Nov. 20, 2018

(65) Prior Publication Data
US 2019/0154807 A1 May 23, 2019

(30) Foreign Application Priority Data

Nov. 21, 2017 (DE) .............................. 102017127420

(51) Int. Cl.
*G01S 7/481* (2006.01)
*G06K 7/10* (2006.01)
(Continued)

(52) U.S. Cl.
CPC .......... *G01S 7/4817* (2013.01); *G01S 7/4808* (2013.01); *G01S 7/4865* (2013.01); *G01S 17/10* (2013.01);
(Continued)

(58) Field of Classification Search
CPC .... G01S 7/4817; G01S 7/4808; G01S 7/4865; G01S 7/4812; G01S 17/10; G01S 17/42;
(Continued)

(56) References Cited

U.S. PATENT DOCUMENTS 4,357,071 A * 11/1982 Mankel .............. G01N 21/8901
250/559.49
4,560,862 A 12/1985 Eastman et al.
(Continued)

FOREIGN PATENT DOCUMENTS

AT 509180 A1 6/2011
CN 106022198 A * 10/2016
(Continued)

OTHER PUBLICATIONS

Wikipedia, Angular velocity, Jul. 3, 2017 (Year: 2017).*
(Continued)

*Primary Examiner* — Yuqing Xiao
*Assistant Examiner* — Woohyeong Cho
(74) *Attorney, Agent, or Firm* — Nath, Goldberg & Meyer; Jerald L. Meyer (57) ABSTRACT

A polygon scanner (10) for detecting objects (24) in a monitored zone (22) is provided having a light transmitter (12); having a light receiver (30); having an evaluation unit (32); and having a rotatable mirror unit (20) for a periodic deflection of the light beam (16) that has a plurality of mirror facets (34) in order thus to scan an angular section multiple times per rotation of the mirror unit (20) by a respective mirror facet (34), wherein at least some of the mirror facets (34) have a different curvature from one another. In this respect, at least one of the mirror facets (34) is configured as a free-form surface whose curvature is adapted to the angle of incidence of the transmitted light beam (16) on the mirror facet (34) that varies during the rotation of the mirror unit (20).

16 Claims, 4 Drawing Sheets

(51) Int. Cl.
*G02B 5/10* (2006.01)
*G02B 26/12* (2006.01)
*G02B 5/09* (2006.01)
*G01S 7/48* (2006.01)
*G01S 7/4865* (2020.01)
*G01S 17/10* (2020.01)
*G02B 7/182* (2021.01)
*G01S 17/42* (2006.01)

(52) U.S. Cl.
CPC ............... *G02B 5/09* (2013.01); *G02B 5/10* (2013.01); *G02B 7/1821* (2013.01); *G02B 26/12* (2013.01); *G02B 26/124* (2013.01); *G06K 7/10702* (2013.01); *G06K 7/10831* (2013.01); *G01S 7/4812* (2013.01); *G01S 17/42* (2013.01)

(58) Field of Classification Search
CPC .......... G02B 5/09; G02B 5/10; G02B 7/1821; G02B 26/12; G02B 26/124; G06K 7/10831; G06K 7/10702
See application file for complete search history.

(56) References Cited

U.S. PATENT DOCUMENTS

| | | | |
|---|---|---|---|
| 4,624,528 A | 11/1986 | Brueggemann | |
| 5,006,721 A | 4/1991 | Cameron et al. | |
| 5,179,271 A | 1/1993 | Lindacher et al. | |
| 6,053,409 A | 4/2000 | Borbst et al. | |
| 6,091,533 A * | 7/2000 | Iizuka | G02B 26/126 359/205.1 |
| 6,135,352 A * | 10/2000 | Girotti | G06K 7/10623 235/454 |
| 6,525,309 B1 * | 2/2003 | Runge | G01D 5/285 250/231.17 |
| 6,896,185 B2 * | 5/2005 | Uhl | G06K 7/10792 235/454 |
| 8,009,186 B2 * | 8/2011 | Tomioka | H04N 1/1135 347/235 |
| 9,104,928 B2 * | 8/2015 | Corrain | G02B 26/12 |
| 2013/0076852 A1 * | 3/2013 | Bai | H04N 3/23 347/261 |
| 2017/0285510 A1 | 10/2017 | Furuta et al. | |

FOREIGN PATENT DOCUMENTS

| | | | | |
|---|---|---|---|---|
| DE | 3602008 A1 * | 7/1987 | | G06K 7/10811 |
| DE | 3602008 A1 | 7/1987 | | |
| DE | 19653312 C1 | 4/1998 | | |
| DE | 102012016788 A1 | 2/2014 | | |
| DE | 102014100245 B3 | 11/2014 | | |
| DE | 102014111138 A1 | 2/2016 | | |
| DE | 102015104021 A1 | 9/2016 | | |
| EP | 0373811 A2 | 6/1990 | | |
| EP | 0967458 B1 | 1/2007 | | |
| EP | 1873685 A2 | 1/2008 | | |
| EP | 1921565 A1 * | 5/2008 | | G06K 7/10702 |
| EP | 1927933 B1 | 3/2010 | | |
| EP | 2983030 B1 * | 11/2021 | | |
| JP | 2756178 B2 * | 5/1998 | | |
| JP | 2011-59111 A | 3/2011 | | |
| KR | 20130002074 A * | 1/2013 | | |
| KR | 20140103516 A * | 8/2014 | | G03G 15/043 |
| WO | 97/33247 A1 | 9/1997 | | |

OTHER PUBLICATIONS

Wikipedia, Focus (optics), Oct. 19, 2015 (Year: 2015).*
RP Photonics Encyclopedia, Focal Length, 2016 (Year: 2016).*
German office action dated Oct. 8, 2018 for corresponding application No. 10 2017 127 420.0.

* cited by examiner

POLYGON SCANNER AND METHOD OF DETECTING OBJECTS IN A MONITORED ZONE

FIELD

The invention relates to a polygon sensor for detecting objects in a monitored zone having a light transmitter for transmitting a light beam into the monitored zone; having a light receiver for receiving the light beam reflected by objects in the monitored zone; having an evaluation unit for evaluating a received signal of the light receiver; and having a rotatable mirror unit for a periodic deflection of the light beam that has a plurality of mirror facets in order thus to scan an angular section as a monitored zone multiple times per rotation of the mirror unit by a respective mirror facet, wherein at least some of the mirror facets have a different curvature from one another. The invention further relates to a method of detecting objects in a monitored zone, in which method a light beam is transmitted and is received again and evaluated after reflection at an object in the monitored zone, wherein an angular range of the monitored zone is periodically scanned in that the light beam is detected at mirror facets of a rotatable mirror unit having a plurality of mirror facets, with the light beam being differently focused in different periods of the scanning by different curvatures of at least some of the mirror facets.

BACKGROUND

Laser scanners are used for a variety of monitoring and measuring tasks. For this purpose, a monitored plane is scanned by a light beam that is deflected by a rotating mirror and the reflected light is evaluated. In a polygon scanner, the rotating mirror has a plurality of mirror facets so that only a part section of the monitored plane is detected, but this multiple times per rotation corresponding to the number of mirror facets. The rotating mirror is also called a polygon mirror wheel or just a polygon wheel.

A possible object of a polygon scanner is just object detection. In order additionally to acquire information on object distances, contours, or profiles, typically not only the presence of objects is determined, but rather simultaneously also their distance. The time of flight is measured for this purpose. Two types of time of flight methods are widespread. In phase-based methods, the light transmitter modulates the scanning beam and the phase between a reference and the received scanning beam is determined. Pulse-based methods impart a significant pattern onto the scanning beam, for example a narrow pulse of only a few nanoseconds duration, and determine the reception time of this pattern. In a generalization called a pulse averaging method, a plurality of pulses or a pulse sequence is transmitted and the received pulses are statistically evaluated.

The specific setup principle of a polygon scanner is frequently used in a barcode scanner where it signifies comparatively few disadvantages to dispense with the typical large detection angle of up to 360° of a laser scanner having only one mirror surface in favor of a scanning rate increased per rotation due to a plurality of mirror facets.

A barcode scanner having a polygon mirror wheel is known, for example, from EP 0 967 458 B1. In addition, a possibility for synchronization is given there in which the respective start of a scan is determined by a mirror facet using a starting sensor. This starting sensor would actually have to be arranged in the region of the transmitted beam, at that position where a respective scan period with a mirror facet starts. However, the construction space is extremely tight there so that EP 0 967 458 B1 suggests instead positioning a deflection unit that directs the light to a less critical location of the starting sensor.

Although barcodes have long also been able to be read by cameras, barcode scanners are still in use in a variety of forms. One of the advantages is that the reading region gains in depth without any greater optical construction effort that is inter alia limited by the spot diameter, that is the extent of the scanning laser spot. Somewhat more precisely, the so-called caustic of the laser beam determines the depth of field zone, i.e. the function of the spot diameter in dependence on the reading distance. To still resolve a barcode bar, the spot diameter may at least not significantly exceed its width.

There are now applications, in particular in the near zone, where the reading fields of a fixed transmission optics are no longer sufficient and a greater depth of the reading region beyond the theoretical boundaries of the depth of field would be desirable. One possibility is to mechanically track the focal position, that is to displace the collimation lens with the aid of actuating elements. On a single-time adaptation during the setting up, the apparatus effort is still straightforward; however, the setting is then fixed up to the next manual change. A dynamic adaptation requires a substantial construction effort due to the high positional accuracy that has to be realized in extremely short positioning times and this is reflected both in the construction size and in the manufacturing costs.

It is proposed in the prior art to give the mirror facets of a polygon scanner different focal properties. At least one mirror surface thus has different focusing properties with respect to the remaining mirror surfaces in DE 36 02 008 A1. Only the received signals that originate from focused received light spots are evaluated in the evaluation electronics. A similar concept with mirror facets of different curvature is also known from U.S. Pat. No. 5,179,271 or 4,560,862. It is, however, respectively not considered there that the curved mirror facets have different effects on the light beam during the scan movement.

There are also other ideas how mirror facets can be varied with respect to one another. Respective different demands are thus satisfied that do not, however, extend the depth of field range. U.S. Pat. No. 4,624,528 thus uses mirror facets to compensate aberrations. This is based on a complex and error-susceptible design using further mirrors and a double reflection at the mirror facets that is thus produced from different directions. DE 10 2015 104 021 A1 uses the different mirror facets to improve the modulation of the received signal. For this purpose, the degree of reflection between the mirror facets is varied to receive signals of different strengths. It is mentioned in the introduction to DE 10 2014 100 245 B3 that the mirror facets of a polygon scanner can be tilted with respect to one another. A height offset is thereby produced in the repeated scans that enables a multilayer scanning. DE 10 2014 111 138 A1 likewise deals with such a multilayer scanning and complements measures to compensate distortion by the tilt.

SUMMARY

It is therefore the object of the invention to further improve the detection using a polygon scanner.

This object is satisfied by a polygon scanner and by a method of detecting objects in a monitored zone in accordance with the respective independent claim. Such a polygon scanner has a rotatable mirror unit having a plurality of mirror facets that deflect the scanning light beam after one another during a rotation. It is in particular a polygon mirror wheel having mirror surfaces or mirror facets at the outer periphery from which the name polygon scanner is derived. At least some of the mirror facets have different curvatures with respect to one another. Since an angular section or segment of the monitored zone is scanned multiple times per rotation of the mirror unit in a polygon scanner, namely once per mirror facet, a multiple scanning results with different focusing properties or with different depth of field zones through the different curvatures.

The invention now starts from the basic idea of not only providing a simple focusing curvature, but also of taking account of the curvature at the different angles of incidence of the transmitted light beam on the respective active mirror facet that is in rotational movement and is thus continuously tilted with respect to the transmitted light beam. At least one mirror facet is configured as a free-form surface for this purpose. The free from allows the optical design the required degrees of freedom to simultaneously provide the desired depth of field zone and the adaptation to the varying angle of incidence. The curvature in particular varies in the peripheral direction of the mirror facet, and indeed preferably not symmetrically, i.e. the curvature from the starting region of the mirror facet up to the center differs from that of the center to the end zone.

The invention has the advantage that the depth of field zone is expanded without any complex and/or expensive actuator-operated focus adjustment unit with control electronics. This makes smaller and less expensive devices possible. With a mirror unit of plastic, it is sufficient to adapt the tools, for example with an injection molding process, to replace the previously flat die inserts with such having the negative free form. Except for the one-time conversion costs, the mirror unit in accordance with the invention can practically be manufactured in a cost-neutral manner. A further advantage is the practically immediate switching of the focal position from one mirror surface to the next that enables a scanning of different working distances in a very short time.

The free-form surface is preferably curved such that the same focal position is set for the varying angles of incidence. The additional curvature of the free form beyond the simple focusing effect here provides a compensation of the rotational movement. Distortion within a scanning line or reading line due to a migrating depth of field zone due to the changing angles of incidence is thereby avoided. It is alternatively also conceivable to generate different focal positions with the free form during the scanning, for example an asymmetry with focal positions shorter to the left of the optical axis than to the right. Such an asymmetry can in particular be selected as exactly opposite in a different mirror facet.

The free-form surface preferably has a tilt from a scanning plane of the light beam. In the peripheral direction, the mirror facets are always tilted with respect to one another, there would otherwise not be a polygon mirror wheel. A tilt with respect to this position in accordance with the definition is meant in this embodiment. At least some mirror facets are therefore effectively chamfered against the plane of the polygon mirror wheel in their optical effect by the shape of the free form. An offset of the scanning lines or reading lines for a multiple scan results from this. An effective tilt of the of the scanning lines or reading lines is also possible in both axes. The barcode is thus detected from a plurality of directions in a barcode scanner, which prevents all the reading lines from randomly extending in parallel with the bars or from not completely transversely sweeping over the barcode.

The free-form surface is preferably curved such that the scanning zone of the transmitted light beam is rectified. Mirror facets are frequently chamfered out of the plane of the polygon mirror wheel, either at different degrees for a multiple scan or together for a deflection in the device. The scanning zone is then no longer a plane, but rather an envelope of a cone so that the scanning lines and reading lines are curved. This effect can also be partly compensated by the free form.

The polygon scanner preferably has an angle determination unit for a monitoring of the rotational position of the mirror unit, with the evaluation unit being configured to identify the respective active mirror facet with the aid of the rotational position. The respective detection angle can thereby be determined so that the measurement values of a laser scanner acquire an at least coarse angular resolution. With a barcode scanner, in contrast, the specific angle is not important. It can, however, be advantageous to identify the respective active mirror facet so that it is known by which optical parameters, in particular by which depth of field zone, the respective signals are detected. The angle determination unit in no way has to finely resolve the angle. Interpolation can take place with a one-time or multiple synchronization per rotation. For this purpose, the time interval between two synchronization times is split over the angular ranges of the mirror facets or even over angle values.

The polygon scanner preferably has a starting sensor that detects the transmitted light beam in each case at the start of a scan with a respective mirror facet, and wherein at least one mirror facet has a modification that enables an identification of the mirror facet from the start signal that the transmitted light beam generates in the starting sensor. Such a starting sensor is known per se, but typically does not generate pulses of the same kind. It is thereby only detected when a new mirror facet has rotated into the transmitted light beam and thus a new scan starts. The modification of the mirror facet serves to associate the start signal, that is to give it an individual property to distinguish it from other start signals. Such a modification can only relate to one mirror facet to enable a one-time synchronization per rotation. The start pulses are them simply counted and then associated up to the next synchronization. It is, however, also conceivable to apply modifications to a plurality of mirror facets or also to all the mirror facets that should then be distinguished from one another.

The mirror facets have a different size as the modification, in particular due to tolerance deviations. This size relates to the peripheral direction. The polygon of the mirror unit is therefore not a regular n-gon, but irregular. A targeted selection of mirror facets of different sizes is preferably not necessary at all, but only the natural tolerances are rather used.

The evaluation unit is preferably configured to teach a time sequence of the start signals as a reference and to identify the respective active mirror facet in operation by comparison of the sequence of the start signals with the reference. Since the number of rotations of the mirror unit can be considered as substantially constant, a mirror unit having mirror facets ideally of the same size would produce a uniform time pattern of the start signals. With mirror facets of different sizes, either by design or by tolerance, this time pattern is displaced in a characteristic manner like a kind of finger print. If the evaluation unit is aware of this time pattern, it can thus compare the start pulses measured and can thus identify the respective active mirror facet.

The mirror facet preferably has a reflectivity and/or curvature differing from the remaining mirror facet as a modification in a starting region that generates the start signal. The starting region is that part of a mirror facet that respectively first rotates into the transmitted light beam. The signal generated here is anyway not yet available for the measurement since it is evaluated by the starting sensor. If now a higher or lower reflectivity is selected for a mirror facet in this starting region, a correspondingly stronger or weaker start signal is produced with which the mirror facet is identified. The transmitted light spot that the transmitted light beam generates on the starting sensor becomes smaller or larger due to a changed curvature in the starting region with a converging or diverging effect so that an identifiable start signal is produced in this manner. Such a contour in the starting region can be directly integrated into the free form. Alternately to a modification in the starting region, the total mirror facet could also be modified. This has advantages in a technical manufacturing aspect depending on the embodiment, but in turn one scan per rotation is lost or is at least changed by the modification.

A pattern of zones of different reflectivity is particularly preferably provided in the starting region. Not only an amplification or attenuation of the start signal is thus produced, but also a light/dark pattern. Examples include a plurality of alternating strips of high and low reflectivity that result in double pulses or multiple pulses in the start signal. This can then be recognized particularly simply to identify the mirror facet.

A speedometer signal of a drive for rotating the mirror unit is preferably supplied to the angle determination unit. The drive, for example, generates a plurality of pulses per rotation as the speedometer signal. The number of the pulses and the number of the mirror facets are then preferably selected in a relatively prime manner. The speedometer pulses and the starting pulses of a starting sensor namely have a different time offset for each mirror facet with these numerical relationships and the mirror facet can be immediately recognized by it. Alternatively to a simple speedometer signal, the use of an encoder is also conceivable that determines the respective angular position, for example, with reference to the scanning of a co-rotating code disk.

The evaluation unit is preferably configured to determine a distance of a scanned object from the received signal using a time of flight method. The polygon scanner thus becomes a distance measuring scanner. This can also be helpful in a barcode scanner in order to know which depth of field zone is actually required in order, for example, to select the scans of the matching mirror facets. Any known time of flight method, of which some were outlined in the introduction, can be considered as the time of flight method.

The evaluation unit is preferably configured to compare the received signals of different mirror facets with one another and to evaluate the received signal having the greatest focus. Only measurements of the mirror facet that best matches the actual object distance are thereby used. Only received signals recorded with a sharp focus are thus effectively further evaluated. Since the determination of the focus signifies a certain evaluation effort, it is also conceivable in the case of a barcode scanner to attempt a decoding with each scan. One of these attempts will automatically relate to the signals having the sharpest focus, but it is ultimately irrelevant with which received signal the decoding is successful. If the rotational position is monitored, it is also conceivable to concentrate on specific mirror facets and only to evaluate those received signals that correspond to an expected parameterized focus or to a focus that is otherwise desired.

The polygon scanner is preferably configured as a barcode scanner and its evaluation unit has a barcode decoder. A large number of advantages and configuration options of a polygon scanner in accordance with the invention in the reading of barcodes have already been discussed.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
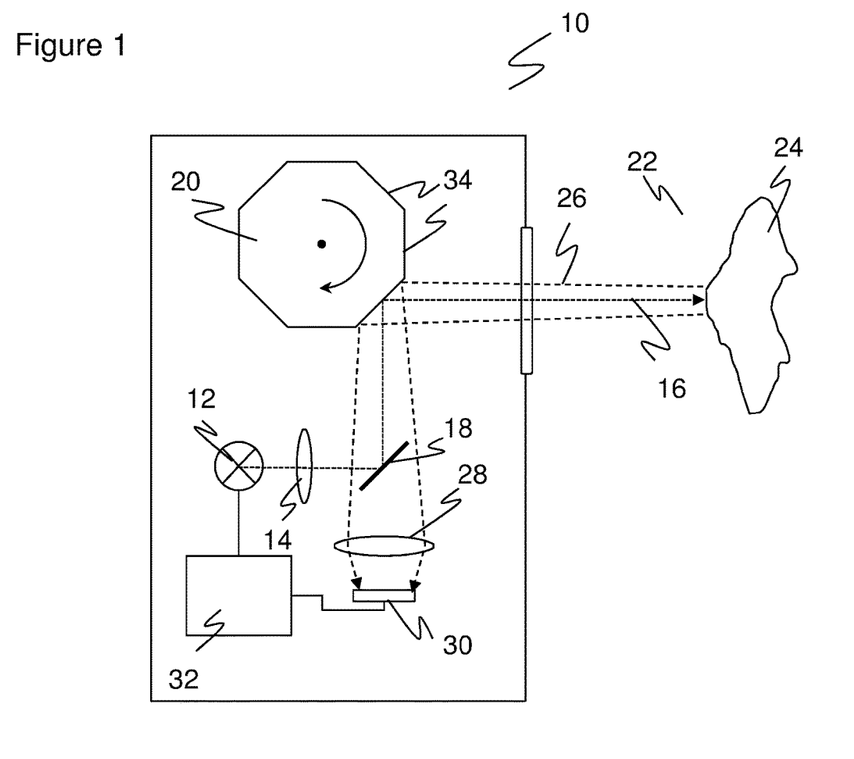
FIG. 1 a schematic sectional view of a polygon scanner.

FIG. 1 shows a block diagram of a polygon scanner 10. A light transmitter 12, for example a laser diode or an LED, generates a light beam 16 with the aid of a transmission optics 14 that is deflected a first time via a fixed deflection element 18 and a second time via a rotating polygon mirror wheel 20 and is then transmitted into a monitored zone 22.

If the light beam 16 is incident on an object 24 in the monitored zone 22, a reflected light beam 26 returns to the polygon scanner 10, is again deflected at the polygon mirror wheel 20, and is then incident on a light receiver 30 via a reception optics 28. No distinction is made here linguistically between reflection and the diffuse remission that occurs substantially more frequently at the object 24. The fixed deflection element 18 is either configured as a beam splitter or is so small that only a negligible part of the reception optics 28 is shaded so that the reflected light beam 26 can pass the fixed deflection element 18. A beam splitter or a biaxial design would also be possible. The transmitted light beam 16 and the reflected light beam 26 are then substantially in parallel with one another with a small distance, for example, in the direction of the axis of rotation of the polygon mirror wheel 20. The basic design of the polygon scanner 10 in accordance with FIG. 1 is therefore only to be understood as an example. The transmission path and reception path can thus also be differently separated than by the shown crossed arrangement with a fixed deflection element 18 or the polygon mirror wheel 20 can be differently arranged and oriented with respect to the transmission path and the reception path. It is also conceivable only to guide the transmitted light beam 16 via the polygon mirror wheel 20 and to use a fixed receiver cell at the reception side, for example.

A received signal generated by the light receiver 30 is transferred to an evaluation unit 32. It is, for example, recognized there whether an object 24 was scanned at all. With a measuring polygon scanner 10, its distance can be determined using a time of flight process. The angular position of the polygon mirror wheel 20 is preferably then additionally determined by a decoder, not shown, or in one of the manners described below, at least coarsely or in an interpolating manner. Object positions or object contours are then detectable overall in polar coordinates. A possible application is the measurement of objects, in particular parcels on conveyor belts. A polygon scanner 10 configured as a barcode scanner attempts to identify and to read barcodes on the object 24 using a decoder of the evaluation unit 32. This is an example of an embodiment that preferably manages without a determination of distances or exact angular positions.

The polygon mirror wheel 20 is set into rotation by a drive, not shown, and is an example for a rotatable mirror unit having a plurality of mirror facets 34 at its outer periphery. The number of mirror facets 34 corresponds to the detected angular range or to the scanned segment of the monitored zone 22 that is the larger, the fewer mirror facets 34 are provided. The shown number of eight mirror facets 34 is accordingly purely exemplary and more or fewer mirror facets 34 can equally be provided. The base surface also does not have to be a regular polygon, but it is in principle also possible to provide mirror facets 34 of different lengths. With a biaxial design in which, unlike in FIG. 1, the transmission path and the reception path diverge, it is conceivable that the mirror facets 34 have their own transmission and reception zones that are differently configured.

Figure 2:
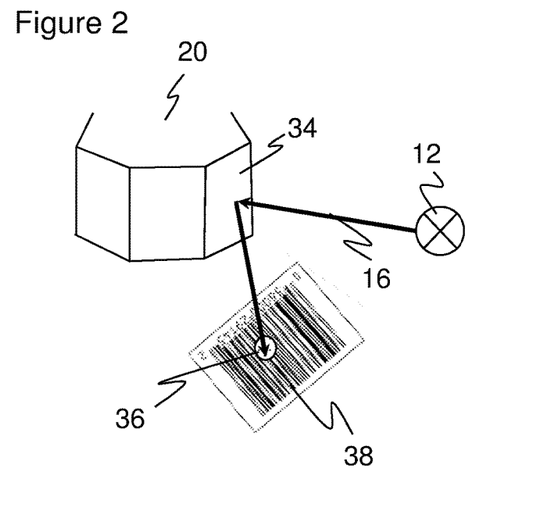
FIG. 2 a schematic three-dimensional view of a polygon mirror wheel and of the beam progression of a scanning beam.

FIG. 2 shows a schematic three-dimensional view of the polygon mirror wheel 20 and of the geometrical arrangement of the transmitted light beam 16. At least one of the mirror facets 34 has a curvature that differs from the remaining mirror facets 34. The light spot 36 that the transmitted light beam 16 generates on the object 24 shown as a barcode 38 here is therefore focused at a different working distance.

In this manner, the distance range to be covered overall is divided into at least two different depth of field zones. The minimal configuration would be that one mirror facet 34 has a curvature and the remaining mirror facets 34 remain flat. At the other end of the scale, there is the possibility of providing each mirror facet 34 with its own curvature and thus to provide a maximum number of different depth of field zones. The invention also comprises the numerous combinations conceivable therebetween of classes of flat, similarly curved, and differently curved mirror facets 34. It is here necessary to weigh up between a fine division of the distance range into a plurality of depth of field zones and the reduced effective scan frequency between two repeated scans in the same depth of field zone. In practice, the optimum between the achievable depth of field and the available scan frequency will lie at two or three different focal positions corresponding to classes of differently curved mirror facets 34. There is also the possibility of compensating a reduced scan frequency by increasing the revolution speed of the polygon mirror wheel 20. It is then, however, not only the drive that must be able to perform this, but also the bandwidth and processing speed of the electronics and in particular of the evaluation unit 32.

During the operation of the polygon scanner 10, the monitored zone 22 is scanned multiple times by the rotation of the polygon mirror wheel 20, namely during a full rotation once each time with every mirror facet 34. This signifies a multiple measurement of the same scene provided it can be output as quasi-stationary within the short rotation period. However, they are not merely measurement repetitions due to the different curvatures of the mirror facets 34. It is rather the case that the focal position jumps between at least some of the mirror facets 34 from one focal position to the next. The evaluation unit 32 therefore receives a plurality of received signals having measurement information that is the same per se, but has a different focus. With a suitable design of the curvatures of the mirror surfaces 34, at least one scan per rotations takes place for each distance of the object 24 to be detected within the depth of field zone or at least close thereto.

The evaluation unit 32 can use the best focused scan through various measures. It is a possibility to determine the focus of the received signal, for example, with reference to contrasts and to select the best received signal. It is another possibility to fix a specific mirror facet 34 from which the best received signal is expected, for example by setting a working distance, from previous knowledge of earlier measurements or of a distance measurement. A best received signal does not necessarily have to be selected during the barcode reading; it can rather be sufficient to attempt a decoding with all the received signals. On a successful decoding, it is then no longer of interest which mirror facet 34 has recorded the received signal. There is, however, the possibility of identifying this mirror facet with reference to the successful decoding and, for example, to prefer it for subsequent reading attempts or to derive an at least coarse distance value therefrom as a further piece of measurement information.

The mirror facets 34 do not have to shape the transmitted light beam 16 alone by their curvature. The preferably provided transmission optics 14 rather already first serves this purpose before the light beam 16 is incident on the polygon mirror wheel 20. The mirror facets 34 then only change the focal position predefined by the transmission optics 14. It is also conceivable to use an adaptive transmission optics 14, for example with a liquid lens via which then the common portion of the focal position and thus all the depth of field zones of the mirror facets 34 are adjusted. A total working zone of the polygon scanner 10 can thereby be adapted.

The mirror facets 34 can also be configured differently in a different respect in addition to their properties relating to the focusing. Examples include different degrees of reflection to divide the dynamic zone analog to the depth of field zone or an additional tilt for a multilayer scanning.

Figure 3:
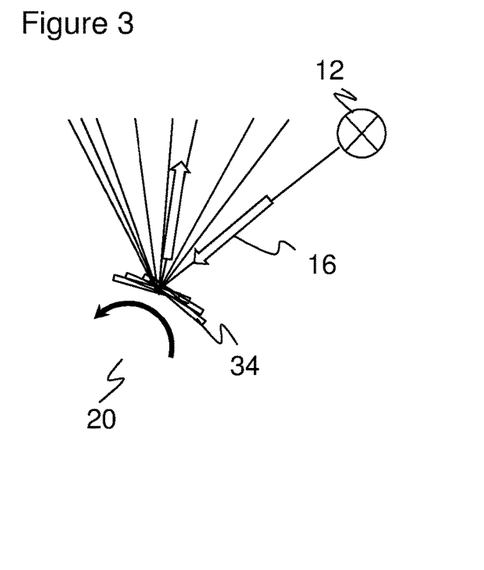
FIG. 3 a schematic view of the beam progression of the scanning beam in different rotational positions of a mirror facet of a polygon mirror wheel.

FIG. 3 is a further representation of the mirror facets 34 and of the geometrical arrangement of the transmitted light beam 16 in now different rotational positions of the polygon mirror wheel 20. It can be clearly realized that the angle of incidence of the transmitted light beam 16 on the mirror facets 34 varies during a scan. A simple convex or concave shape of the mirror facets 34 does not satisfy this different angle of incidence, but would rather result in an uncontrolled variation of the focal position during the scan.

At least one of the mirror facets 34 is therefore formed as a free-form surface that is adapted to the varying angle of incidence. The free form preferably provides that the focal position does not change during the rotation over the mirror facet 34, that is the working distance remains constant. It is, however, also conceivable to change the focal position in a targeted manner by the free form, for instance to increase it from the start to the end of a scan or conversely to reduce it. The free-form surface is then asymmetrical and the focal position is shorter on one side of the optical axis than on the other.

Figure 4:
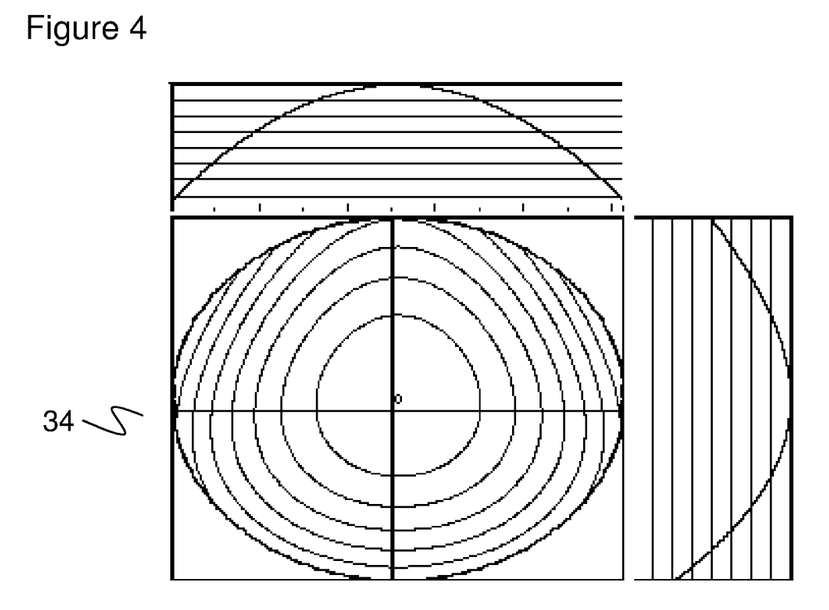
FIG. 4 a representation of an exemplary free-form surface for a mirror facet.

FIG. 4 shows an example of a free form for a mirror facet 34 that holds the focal position constant with a varying angle of incidence during a scan. The specific shape is the result of an optics simulation that adapts the curvature constantly and distinguishable manner dependent on the position. The free-form surface is shown as an extended polynomial having preferably 14 terms in FIG. 4 and is to be understood as an example. The light spot 36 migrates during the scan in the peripheral direction over the mirror facet 34, from top to bottom in FIG. 4, and is preferably centered in the vertical position perpendicular thereto, in the horizontal direction in FIG. 4.

The curvatures of the free form of the mirror facet 34 that act on the transmitted light beam 16 during the scan differ as intended in dependence on the angle of incidence and this change is, as can be recognized from the density of the contour lines and from the representation of the Y curve of the curvature at the right in FIG. 4, preferably not symmetrical to the center in the direction of movement of the light spot 36. The free form rather drops toward the end, that is downward in FIG. 4, with a greater slope and to a lower level. In other words, the free form has, in the peripheral direction oriented in accordance with the rotation, a steeper rising flank and a shallower falling flank.

Figure 5:
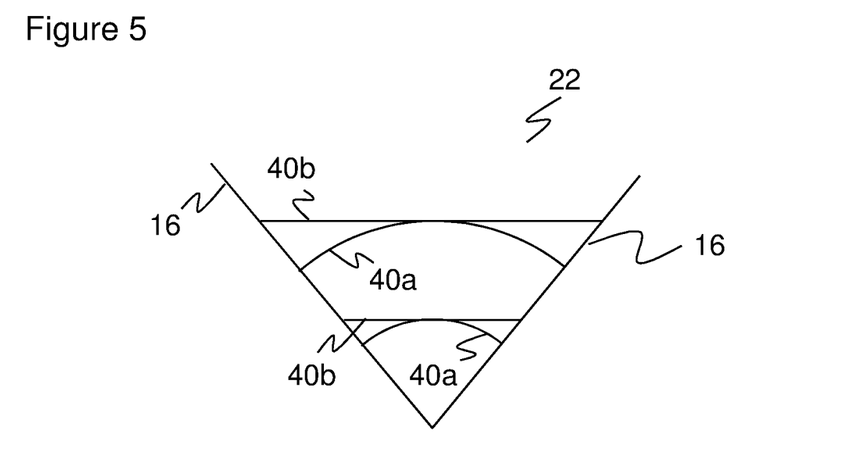
FIG. 5 an explanatory sketched representation of scanning lines or reading lines that have been rectified by a free-form surface.

FIG. 5 explains the possibility of additionally achieving a rectification of the scan zones with the free form of the mirror facet 34. In the monitored zone 22, the light spot 36 of the transmitted light beam 16 generates scanning lines or reading lines 40*a-b* on a virtual or actual plane perpendicular to the transmitted direction. Without a special compensating curvature in the free form, such reading lines 40*a* are often curved as explained briefly in the introduction and in detail in DE 10 2014 111 138 A1 quoted there. The reading lines 40*a* can be changed and can in particular be rectified to form straight reading lines 40*b* by adaptations in the free form.

Figure 6:
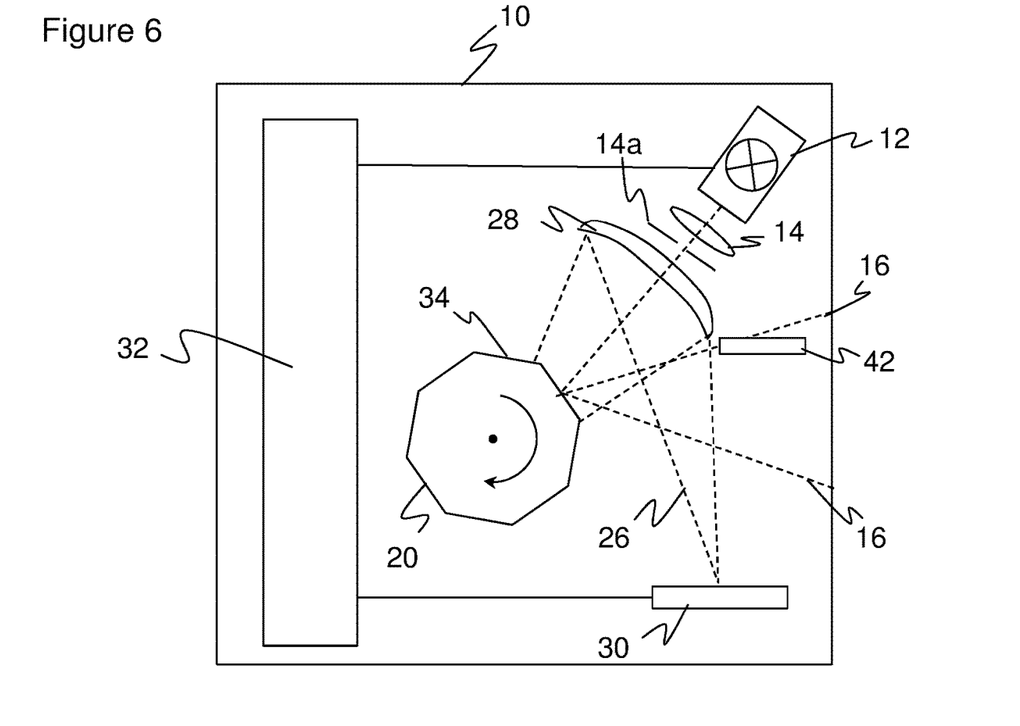
FIG. 6 a schematic sectional view of a further embodiment of a polygon scanner with a starting sensor.

FIG. 6 shows a schematic sectional view of a further embodiment of a polygon scanner 10. In this respect, the design is changed with respect to FIG. 1, on the one hand, to again emphasize the exemplary character. As already explained with respect to FIG. 1, the invention is not restricted to the specific design of either FIG. 1 or FIG. 6. In the embodiment in accordance with FIG. 6, the transmission optics 14 has an additional aperture 14*a*. The reception optics 28 is of a reflective design. The optical axis of the light transmitter 12 coincides with the optical axis of the reception optics 28 so that the fixed deflection element 18 of FIG. 1 can be dispensed with.

In addition, a starting sensor 42 is arranged n the transmission path, and indeed at a position that the transmitted light beam 16 passes at the start of a respective scan with a mirror facet 34 newly rotated into the optical path and thus now active. Instead of the starting sensor 42 itself, a light deflection element can also be positioned at this position to be able to accommodate the actual starting sensor 42 at a different position. A starting sensor 42 is also conceivable in the embodiment in accordance with FIG. 1 or with the variants named there. The connection of the starting sensor 42 to the evaluation unit 32 is not shown for reasons of clarity.

The starting sensor 12 registers the transmitted light beam 16 or the light spot 36 generated thereby at the start of a respective scan and generates an electronic start signal. A number of start signals that corresponds to the number of mirror facets 34 arises per rotation of the polygonal mirror wheel. The further detection can thus be synchronized. However, no association with specific mirror facets 34 is possible since the start signals are almost identical with one another. It would, however, be advantageous to know the respective active mirror facet 34 and thus its properties, in particular the associated focal position, for the further evaluation and for an optimum setting of the signal conditioning parameters, or for the further operation.

Figure 7:
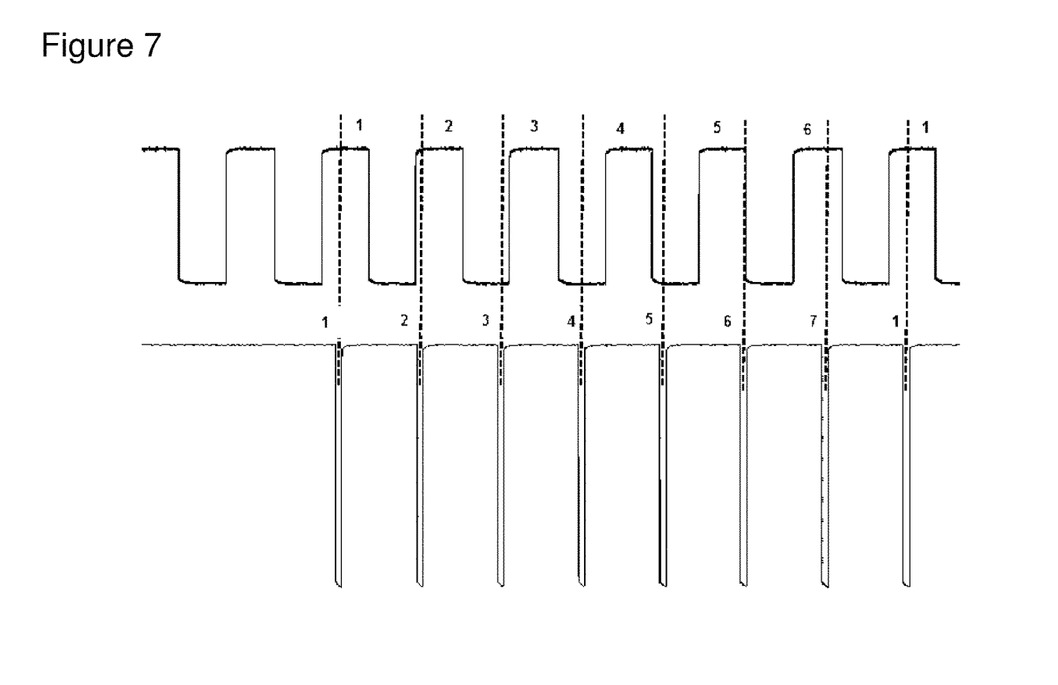
FIG. 7 exemplary signal progressions of a speedometer signal of a drive of a polygon mirror wheel and of the start signals of a starting sensor, FIGS. 8*a-d* representations of different modifications of the reflectivity in the starting region of a mirror facet to generate an identifiable start signal.

FIG. 7 illustrates a first embodiment for identifying the active mirror facet 34 with the aid of a speedometer signal of the drive of the polygon mirror wheel 20. In this respect, pulses of the speedometer signal are shown in the upper part and pulses of the start signal in the lower part. The speedometer signal delivers six pulses per rotation; the polygon mirror wheel 20 has seven facets and thus generates seven pulses. The numbers are only examples, but it is advantageous that they are relatively prime to one another. This namely results in a time offset characteristic for each mirror facet 34 between the speedometer pulses and the start pulses 34 at which the mirror facet 34 is immediately and unambiguously identifiable.

The speedometer signal can also bridge breaks in which no start signal is available by interpolation or by extrapolation. In many applications, the light transmitter 12 is namely only switched on demand or, for example, by a reading trigger. It can therefore be sensible to continue the association of mirror facets 34 beyond such breaks by means of the speedometer signal. The active mirror facet 34 is then immediately known on the next reading demand and no initial scans are lost by a new association of mirror facets 34.

FIGS. 8*a-d* show different embodiments of the polygon mirror wheel 20 having a mirror facet 34 that has changed reflection properties in its starting region 34*a*. In this respect, the starting region 34*a* is that part of the mirror facet 34 that respectively first rotates into the transmitted light beam 16 and thus reflects it into the starting sensor 42. The light spot 36 is drawn relatively large with respect to the starting region 34*a*, which is, however, preferably the case since otherwise the starting region 34*a* adopts too large a portion of the mirror facet 34 and impairs the actual measurement too much.

The starting region 34*a* is changed in its degree of reflection in the embodiments in accordance with FIGS. 8*a-d*. A reduced degree of reflection is preferably set, for example, by blacking or by matting. A change of the surface structure is also possible, which has the advantage that it can be directly introduced into a plastic together with the free form. An increase in the degree of reflection also works, but can give rise to technical difficulties since the mirror facets 34 anyway already have a high degree of reflection, for instance in the form of metalized surfaces.

The starting region 34*a* of only one mirror facet 34 is preferably modified. One synchronization per rotation is thus possible; the other mirror facets 34 can be associated by counting off start signals. Modifying a plurality of mirror facets 34 in their starting region 34*a* is, however, also conceivable. It is furthermore conceivable not only to modify the starting region 34a, but also a total mirror facet 34. This is possibly easier to implement and easier to modify from a technical manufacturing aspect; such a mirror facet 34 that can be modified a lot more can possible already be identified without the starting sensor 42 from the received signal of the light receiver 30. This mirror facet 34 is sacrificed for this purpose for the actual measurement or the received signal thus generated is at least worse.

Figure 8A:
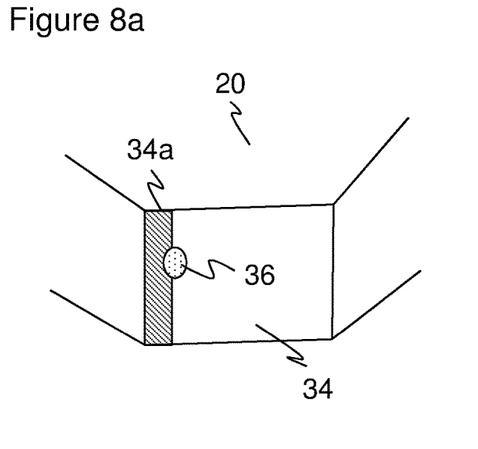
Figure 8B:
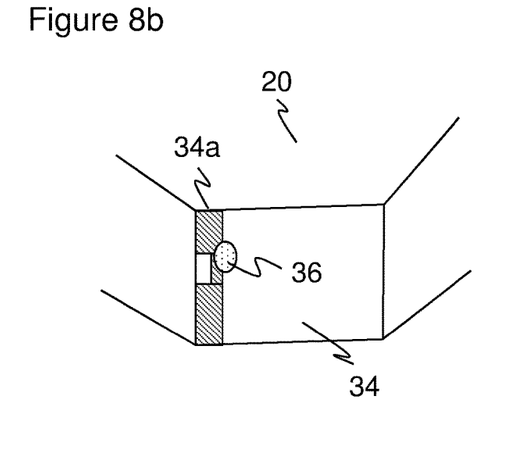
Figure 8C:
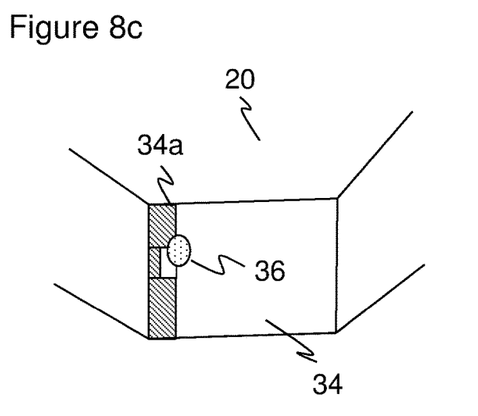
Figure 8D:
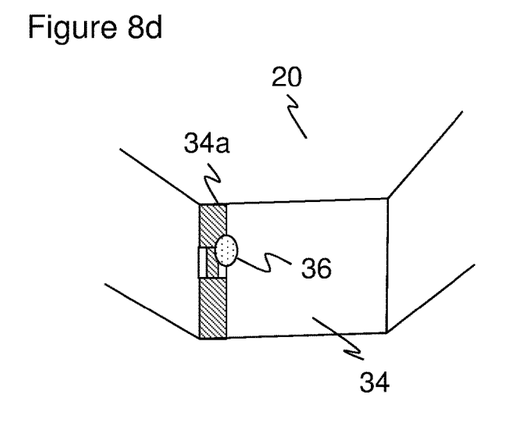

The effect of the changed degree of reflection in the starting region 34a is that the start signal is changed in a recognizable manner. FIGS. 8a-d show different, non-exclusive examples. In FIG. 8a, the degree of reflection is decreased or increased in the same manner in the total starting region 34a. The start pulse of this mirror facet 34 thus has a higher or lower amplitude than the remaining start pulses and can thus be distinguished. In FIGS. 8b-d, the region having a decreased or increased degree of reflection only adopts a portion of the available width of the starting region 34a. This only relates to the vertical position in the representation in which the light spot 36 is also disposed. Alternatively, strips can extend over a different vertical region or over the total vertical region. The effect is a temporally somewhat more delayed, narrower start pulse in FIG. 8b; in FIG. 8c a likewise narrower start pulse that ends prematurely. In FIG. 8d, the light spot 36 is incident on a region having the original reflectivity twice within the starting region so that a double pulse is produced that can be distinguished particularly easily. The amplitude, width, time offset, and number of pulses in the start signal can thus be changed using the principles explained with reference to FIGS. 8a-d and the unambiguous identification of the associated mirror facet 34 is thereby made possible.

Figure 9:
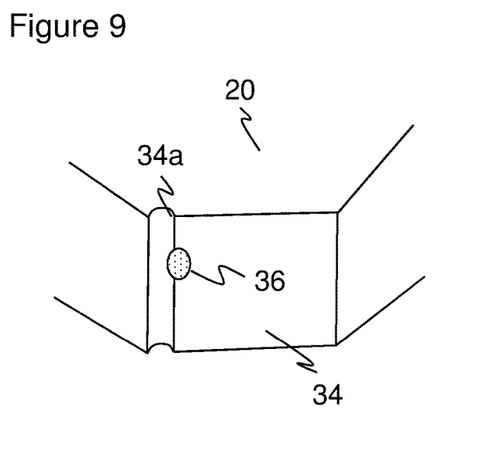
FIG. 9 a representation similar to FIGS. 8*a-d*, but with a modified curvature instead of a modified reflectivity.

FIG. 9 again shows an embodiment of the polygon mirror 20 having a mirror surface 34 that is modified in its curvature behavior instead of its relativity in its starting region 34, for example by a convex or concave contour. Both would also be conceivable in a combined manner. The advantage of a changed curvature behavior is that it can be directly integrated into the free shape and thus remains practically cost-neutral. The additional curvature decreases or increases the light spot 36 on the starting sensor 42 and the start signal accordingly becomes narrower or wider, whereby the mirror facet 34 can be recognized.

A further possibility of modifying mirror facets 34 relates to their lengths in the peripheral direction. The time sequence of the start pulses that is regular with mirror facets 34 of equal length is changed with different lengths. It is conceivable here to lengthen mirror facets 34 directly with the result that the base surface of the polygon mirror wheel 34 is no longer a regular n-gon. However, the manufacturing tolerances of the length can also only be used or larger tolerances are provided in an intermediate solution. Imbalances that arise due to the different lengths, but also due to the free forms in the polygon mirror wheel 20 can be taken into account and can be compensated at the construction side.

The changed time sequence can then be taught or parameterized in the evaluation unit 32 as a kind of finger print or reference. In operation, the sequence of the start pulses is then compared with the reference to thus determine the respective active mirror facet 34.

Additional sensors are furthermore conceivable that monitor the angular position of the polygon mirror wheel 20, for example an encoder or a magnetic sensor, that detects one or more magnets attached in a known angular position on the polygon mirror wheel 20.

The invention claimed is:

1. A polygon scanner for detecting objects in a monitored zone, the polygon scanner comprising:
   a light transmitter for transmitting a light beam into the monitored zone to generate a light spot on a scanned object;
   a light receiver for receiving the light beam reflected by objects in the monitored zone;
   an evaluation unit for evaluating a received signal of the light receiver; and
   a rotatable mirror unit for a periodic deflection of the light beam that has a plurality of mirror facets in order thus to scan an angular section as a monitored zone multiple times per rotation of the mirror unit by a respective mirror facet,
   wherein at least some of the mirror facets have a different curvature from one another, with said different curvatures not symmetrical to a center in a direction of movement of rotation of the mirror unit,
   wherein at least one of the mirror facets is configured as a free-form surface whose curvature is adapted to the angle of incidence of the transmitted light beam on the mirror facet that varies during the rotation of the mirror unit, and is curved so that a same focal position is set for the varying angles of incidence,
   and wherein the different curvatures establish a free fore in the peripheral direction oriented in accordance with the rotation so that the varying angles of incidence change the focal position in a targeted manner corresponding to the free-form surface.

2. The polygon scanner in accordance with claim 1, wherein the free-form surface has a tilt from a scanning plane of the light beam.

3. The polygon scanner in accordance with claim 1, wherein the free-form surface is curved such that the scanned region of the transmitted light beam is rectified.

4. The polygon scanner in accordance with claim 1, that has an angle determination unit for a monitoring of the rotational position of the mirror unit, and the evaluation unit being configured to identify the respective active mirror facet with the aid of the rotational position.

5. The polygon scanner in accordance with claim 1, that has a starting sensor that detects the transmitted light beam in each case at the start of a scan by a respective mirror facet, and wherein at least one mirror facet has a modification that enables an identification of the mirror facet from the start signal that the transmitted light beam generates in the starting sensor.

6. The polygon scanner in accordance with claim 5, wherein the mirror facets have a different size as the modification.

7. The polygon scanner in accordance with claim 6, wherein the mirror facets have a different size as the modification due to tolerance deviations.

8. The polygon scanner in accordance with claim 6, wherein the evaluation unit is configured to teach a time sequence of the start signals as a reference and to identify the respective active mirror facet in operation by comparison of the sequence of the start signals with the reference.

9. The polygon scanner in accordance with claim 5, wherein the mirror facet has a reflectivity and/or curvature differing from the remaining mirror facet as a modification in a starting region that generates the start signal.

10. The polygon scanner in accordance with claim 9, wherein a pattern of regions of different reflectivity is provided in the starting region.

11. The polygon scanner in accordance with claim 4, wherein a speed signal of a drive for rotating the mirror unit is supplied to the angle determination unit.

12. The polygon scanner in accordance with claim 1, wherein the evaluation unit is configured to determine a distance of a scanned object from the received signal using a time of flight method.

13. The polygon scanner in accordance with claim 1, wherein the evaluation unit is configured to compare the received signals of different mirror facets with one another and to evaluate the received signal having the greatest focus.

14. The polygon scanner in accordance with claim 1, that is configured as a barcode scanner and whose evaluation unit has a barcode scanner.

15. A method of detecting objects in a monitored zone, wherein a light beam is transmitted and is received again and evaluated after reflection at an object in the monitored zone to generate a light spot on a scanned object, wherein an angular range of the monitored zone is periodically scanned in that the light beam is detected at mirror facets of a rotatable mirror unit having a plurality of mirror facets, with the light beam being differently focused in different periods of the scanning by different curvatures of at least some of the mirror facets, with said different curvatures not symmetrical to a center in a direction of movement of the mirror unit, wherein the light beam is focused within a scanning period by curved mirror facets configured as free form in a manner adapted to the angle of incidence of the transmitted light beam on the mirror facet that varies during the rotation of the mirror unit, so that a same focus position is set for the varying angles of incidence, and wherein the different curvatures establish a free form in the peripheral direction oriented in accordance with the rotation so that the varying angles of incidence change the focal position in a targeted manner corresponding to the free-form surface.

16. A polygon scanner for detecting objects in a monitored zone, the polygon scanner comprising:
 a light transmitter for transmitting a light beam into the monitored zone to generate a light spot on a scanned object;
 a light receiver for receiving the light beam reflected by objects in the monitored zone;
 an evaluation unit for evaluating a received signal of the light receiver; and
 a rotatable mirror unit for a periodic deflection of the light beam that has a plurality of mirror facets in order thus to scan an angular section as a monitored zone multiple times per rotation of the mirror unit by a respective mirror facet,
 wherein at least some of the mirror facets have a different curvature from one another, with said different curvatures not symmetrical to a center in a direction of movement of rotation of the mirror unit,
 wherein at least one of the mirror facets is configured as a free-form surface whose curvature is adapted to the angle of incidence of the transmitted light beam on the mirror facet that varies during the rotation of the mirror unit, and is curved so that a same focal position is set for the varying angles of incidence,
 and wherein the different curvatures establish a free form in the peripheral direction oriented in accordance with the rotation so that the free form has a steeper rising flank and a shallower falling flank.

\* \* \* \* \*